United States Patent
Gougian et al.

(10) Patent No.: US 10,094,741 B2
(45) Date of Patent: Oct. 9, 2018

(54) OBSTRUCTION DETECTING SYSTEM FOR MOTOR VEHICLE EXHAUST PIPES

(71) Applicants: Ruth Anne Gougian, Pepperell, MA (US); Susan Lucia Gougian, Pepperell, MA (US)

(72) Inventors: Ruth Anne Gougian, Pepperell, MA (US); Susan Lucia Gougian, Pepperell, MA (US)

( * ) Notice: Subject to any disclaimer, the term of this patent is extended or adjusted under 35 U.S.C. 154(b) by 153 days.

(21) Appl. No.: 14/998,418

(22) Filed: Jan. 4, 2016

(65) Prior Publication Data
US 2017/0191900 A1 Jul. 6, 2017

(51) Int. Cl.
| | |
|---|---|
| *B60R 22/00* | (2006.01) |
| *G01M 15/10* | (2006.01) |
| *G01L 13/00* | (2006.01) |
| *E05F 15/72* | (2015.01) |

(52) U.S. Cl.
CPC ............ *G01M 15/106* (2013.01); *E05F 15/72* (2015.01); *G01L 13/00* (2013.01)

(58) Field of Classification Search
CPC ........ G01M 15/106; E05F 15/70; B60Q 9/00; G01L 13/00
USPC .............................................. 701/36, 45, 49
See application file for complete search history.

(56) References Cited

U.S. PATENT DOCUMENTS

| | | | | |
|---|---|---|---|---|
| 9,008,854 B2* | 4/2015 | Breed | .................... | G01C 21/26 701/1 |
| 2011/0248856 A1* | 10/2011 | Obenchain | ............ | A61M 16/20 340/606 |
| 2013/0327019 A1* | 12/2013 | Zhan | ........................ | F01N 3/106 60/274 |
| 2015/0276552 A1* | 10/2015 | Story | ...................... | F01N 11/00 73/114.76 |
| 2016/0169784 A1* | 6/2016 | Smith | ..................... | F01N 9/002 73/23.33 |

* cited by examiner

*Primary Examiner* — Thomas G Black
*Assistant Examiner* — Luat T Huynh

(57) ABSTRACT

An obstruction detecting system for identifying the existence of an obstruction or a partial obstruction in or at the opening of a motor vehicle exhaust pipe. The obstruction detecting system may include a sensor having the ability to detect an obstruction or a partial obstruction in a motor vehicle exhaust system. The obstruction detecting system may include a logic device, a plurality of relays, an alarm, and a motor. The obstruction detecting system may be contained in a housing that is capable of being mounted in or near a motor vehicle exhaust system. When the obstruction detecting system senses an obstruction or a partial obstruction in or at the opening of the exhaust pipe, the system may send an electrical signal to an alarm, which may be a visual alarm, an audible alarm, or both. The alarm may be located in the vehicle control panel, and may alert the operator and passengers of a motor vehicle of an obstruction or a partial obstruction in or at the opening of a motor vehicle exhaust pipe, when the motor is operating. The obstruction detecting system may send an electrical signal to a motor for the purpose of lowering a window in a motor vehicle.

4 Claims, 1 Drawing Sheet

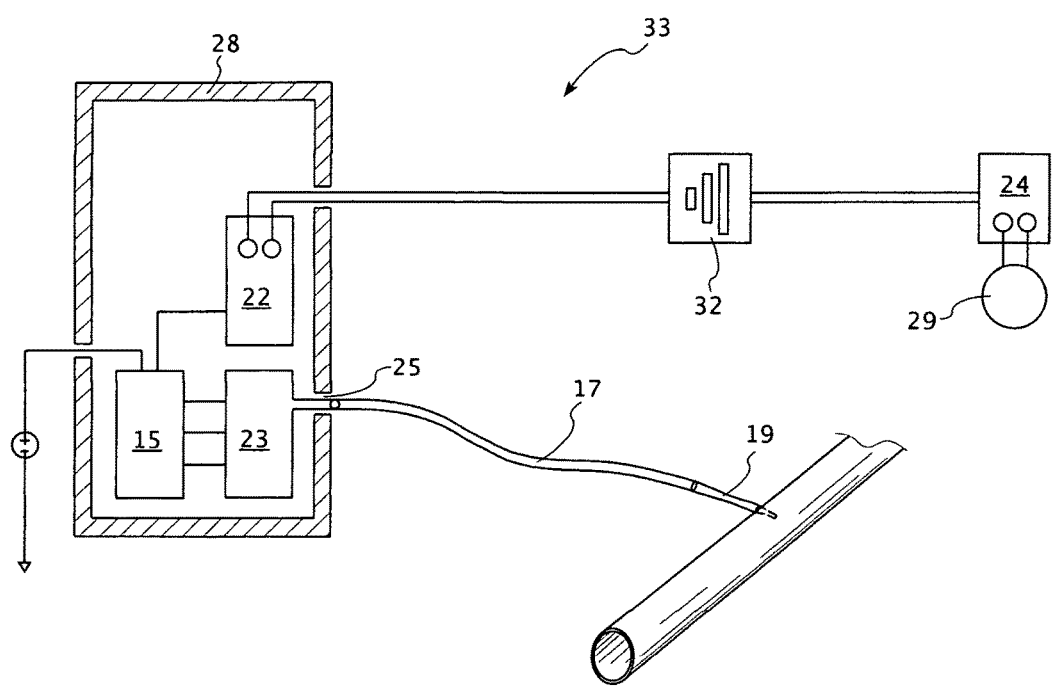

OBSTRUCTION DETECTING SYSTEM FOR MOTOR VEHICLE EXHAUST PIPES

CROSS-REFERENCE TO RELATED APPLICATIONS

Not Applicable

STATEMENT REGARDING FEDERALLY SPONSORED RESEARCH OF DEVELOPMENT

Not Applicable

REFERENCE TO MIROFICHE APPENDIX

Not Applicable

FIELD OF THE INVENTION

The present invention relates to obstruction detecting systems, more particularly to safety systems for motor vehicles.

BACKGROUND OF THE INVENTION

Motor vehicle exhaust systems emit toxic and noxious gases such as hydrocarbons, nitrogen oxides, and carbon monoxide. Of these gases, carbon monoxide (CO) is perhaps the most harmful. Carbon monoxide is an invisible, odorless, and tasteless gas that can only be detected by a carbon monoxide detector. According to the Centers for Disease Control and Prevention, each year more than 400 Americans die from unintentional carbon monoxide poisoning not linked to fires, more than 20,000 visit the emergency room, and more than 4,000 are hospitalized. The National Highway Traffic Safety Administration reports that over 120 people die each year from accidental carbon monoxide poisoning due to carbon monoxide exposure while in motor vehicles.

Motor vehicle exhaust systems may become obstructed or partially obstructed due to snow, debris, mud, or the like. When a motor vehicle exhaust system is obstructed or partially obstructed, while the motor is operating, dangerous emissions may accumulate in the vehicle where humans or animals may be present. The occupants of the vehicle may be exposed to toxic fumes such hydrocarbons, nitrogen oxides, and carbon monoxide, which may cause sickness or death.

Some vehicles have a device called a catalytic converter, which converts carbon monoxide to carbon dioxide before being emitted into the atmosphere. Although catalytic converters may reduce up to 95% of carbon monoxide (CO) emissions, they do not eliminate the potential of carbon monoxide poisoning to occupants in a vehicle where carbon monoxide has built up to a dangerous level. Further, a catalytic converter will not function if there is a blockage in an exhaust pipe, because a blockage will cause gases to bypass the catalytic converter and escape.

Carbon monoxide detectors are designed to alert occupants of the presence of carbon monoxide in a closed environment, such as a home or a living space. Although conventional motor vehicles are not equipped with carbon monoxide detectors, carbon monoxide detectors for use in vehicles are available on the market. Motor vehicle manufacturers do not equip vehicles with carbon monoxide detectors because these devices may not tolerate extreme fluctuations in temperature, which occur inside closed vehicles, especially in seasonal climates. Also, exhaust fumes entering the vehicle when doors or windows are open, and high humidity can signal a false alarm.

The present invention does not replace the need for a carbon monoxide detector in a motor vehicle. The present invention may alert the occupants of a motor vehicle of the existence of an obstruction or a partial obstruction in a motor vehicle exhaust system, which may lead to the buildup of carbon monoxide in a motor vehicle if the motor is operating.

The object of the present invention is to alert occupants of a motor vehicle of an obstruction or a partial obstruction in a vehicle exhaust system, before there is a buildup of carbon monoxide in the operating motor vehicle.

Conventional safety systems in motor vehicles often include alarms, which may be visual, audible, or both, to alert the operator and passengers of safety issues. Usually, these alarms are located on the control panel of a motor vehicle, and may only be seen or heard by an operator or a passenger who is inside the motor vehicle.

On some occasions, the operator of the motor vehicle may be outside of the vehicle performing a task, such as removing snow or ice, shoveling, or cleaning the windshield, and may be unable to see or hear am alarm. The windows or doors of the vehicle may be closed while the motor is operating, particularly in cold weather, if the vehicle is being heated.

In the event that there is an obstruction or a partial obstruction in the exhaust system of a motor vehicle, while the motor is operating and a passenger is inside the vehicle, the passenger may be at risk of carbon monoxide poisoning. When the passenger is an infant, a sleeping person, an animal, or a person who does not understand that he is in danger, an alternative safety feature may be necessary for the survival of the passenger.

The present invention solves this problem not only by using a visual alarm, an audible alarm, or both, but also by using a motor for the purpose of lowering a window in a motor vehicle to reduce the risk of carbon monoxide poisoning to the occupants.

The present invention is a needed, long-sought solution to the problem of carbon monoxide poisoning due to an obstruction or a partial obstruction in a motor vehicle exhaust system while the motor is operating.

BRIEF DESCRIPTION OF THE INVENTION

The present invention is an obstruction detecting system for the purpose of detecting the existence of an obstruction or a partial obstruction in a motor vehicle exhaust pipe. The present invention being comprised of a differential pressure sensor, a logic device, a plurality of relays, an alarm, and a motor. The differential pressure sensor being capable of generating an input signal to a logic device. The logic device capable of generating an output signal to a relay. A relay capable of generating an output signal to actuate an alarm, which may be a visual alarm, an audible alarm, or both. The differential pressure sensor being highly sensitive and able to detect changes in air pressure in response to applied pressure. The logic device capable of generating an output signal to a latching relay. A latching relay capable of actuating a motor for the purpose of lowering a window in a motor vehicle.

BRIEF DESCRIPTION OF THE DRAWING

The description of the present invention along with the drawings disclose the present invention.

FIG. 1 A plan view of the present invention coupled with a motor vehicle exhaust pipe

| NUMBERING OF THE DRAWING | |
| --- | --- |
| Pressure sensor 23 | Logic device 15 |
| Relay 22 | Plastic tubing 17 |
| Metal tube 19 | Housing 28 |
| Alarm 32 | Obstruction detecting system 33 |
| Latching relay 24 | Motor 29 |
| Hole 25 | |

DETAILED DESCRIPTION OF THE INVENTION

Referring to FIG. 1, the present invention is an obstruction detecting system 33 for the purpose of detecting the existence of an obstruction or a partial obstruction in a motor vehicle exhaust pipe.

The present invention is comprised of a differential pressure sensor 23, a logic device 15, an alarm 32, a relay 22, a latching relay 24, and a motor 29.

The obstruction detecting system 33 being capable of determining whether an exhaust pipe system has an obstruction or a partial obstruction at the open end of the pipe, which could cause a buildup of carbon monoxide in a motor vehicle if the motor is operating. The obstruction detecting system 33 having an alarm 32 for the purpose of alerting occupants of a motor vehicle of an obstruction or a partial obstruction in a motor vehicle exhaust pipe. The alarm 32 may be a visual alarm, an audible alarm, or both. The obstruction detecting system 33 having a motor 29 for the purpose of lowering a window in a motor vehicle.

The obstruction detecting system 33 may be powered by the battery of a motor vehicle. The obstruction detecting system 33 being functional when the motor of a motor vehicle is operating. In another embodiment, the obstruction detecting system 33 may be powered by a different battery.

According to the present invention, the differential pressure sensor 23 capable of detecting a change in air pressure in response to applied pressure at the open end of an exhaust system of a motor vehicle. The differential pressure sensor 23 being capable of generating an input signal to a logic device 15. The logic device 15 being capable of generating an output signal to relay 22. The relay 22 being capable of generating an electrical signal to actuate alarm 32. The alarm 32 may be a visual alarm, an audible alarm, or both. The logic device 15 capable of generating an output signal to a latching relay 24. The latching relay 24 being capable of generating an electrical signal to actuate a motor 29 for the purpose of lowering a window in a motor vehicle in response to a change in air pressure in a motor vehicle exhaust system. According to the present invention, logic device 15 being a programmable microprocessor. The logic device 15 may be programmed by a person skilled in the art.

In another embodiment, a plurality of latching relays may be used to actuate a plurality of motors, for the purpose of lowering a plurality of windows in a motor vehicle.

The obstruction detecting system 33 may be connected by electrical wires to a control panel of a motor vehicle. The obstruction detecting system 33 may be installed at the time the motor vehicle is manufactured, or may be installed in an existing motor vehicle by an automobile technician.

Referring to FIG. 1, the differential pressure sensor 23, and logic device 15 being contained in a housing 28. The housing 28 having a hole 25 on one side through which the conduit of the pressure sensor extends. The housing 28 having a plurality of compartments for the purpose of securing each component. The material from which the housing 28 is constructed being about 3/32 of an inch in thickness.

The housing 28 being constructed of a non-corrosive, slippery, non-stick material, which is heat resistant and cold resistant. The non-corrosive, slippery, non-stick material preferably being a plastic resin, selected from a group of plastic resins including polypropylene, polytetrafluoroethylene, and high performance nylon. In another embodiment, the housing 28 being constructed of a metal, including aluminum, titanium, chromium and magnesium, or a metal alloy. In another embodiment, the housing 28 being constructed from an advanced ceramic material, which is heat resistant and cold resistant.

The housing 28 being configured to be mountable or otherwise affixable to or near an exhaust system of a motor vehicle. The housing 28 may require hardware such as a fixture, screws, washers, and bolts, to be mounted. The housing 28 may be affixed using an adherent such as solder, glue, or the like.

The pressure sensor 23 preferably being a highly-sensitive differential pressure sensor capable of determining a change in air pressure, including a slight change at low pressure. In another embodiment, the sensing device may be a pressure switch, a photoelectric sensor, a fiber optic sensor, an ultrasonic transducer, or the like. In another embodiment, a plurality of sensing devices may be used to detect an obstruction or a partial obstruction in a motor vehicle exhaust system. The sensing devices may be the same type of device, or a combination of different sensing devices.

Referring to FIG. 1, the differential pressure sensor 23 using plastic tubing 17 and a metal tube 19 for the purpose of allowing the unit to sense a change in air pressure within an exhaust system. The metal tube 19 preferably being brass, aluminum, chromium, or copper. In another embodiment, the tube may be plastic or ceramic. The metal tube 19 being about 2 inches in length and 1/8 inch in diameter. The metal tube 19 should be inserted about 1/2 inch into the exhaust pipe. The exhaust pipe may be pierced to produce a hole about 1/8 inch in diameter and the metal tube 19 being held in place by pressure, or further secured using solder, glue, or the like. The exhaust pipe may be pierced using a method known by a person skilled in the art.

The plastic tubing 17 being non-corrosive, heat resistant, and cold resistant, preferably constructed from, polypropylene, polytetrafluoroethylene, or a high performance nylon. The inside diameter of the tubing 17 being about 1/8 of an inch, and being about 1/8 of an inch in thickness. The length of the plastic tubing 17 may vary according to the location of the housing and the exhaust pipe, but in most cases the tubing 17 being about 12 inches in length.

Referring to FIG. 1, the end of the plastic tubing 17 being placed over the conduit of pressure sensor 23, and the opposite end of plastic tubing 17 being placed over the end of metal tube 19.

In another embodiment the obstruction detecting system 33 may be capable of communicating wirelessly with a control panel. The obstruction detecting system 33 may be equipped with a transmitter. The transmitter being capable of receiving an input signal from a logic device 15, and capable of sending an output signal via radio frequency to a control panel in a remote location, to actuate an alarm 32. The alarm 32 may be a visual alarm, an audible alarm, or both. The transmitter being capable of receiving an input signal from a logic device 15, and capable of sending an output signal to actuate a motor 29 for the purpose of lowering a window in a motor vehicle.

In another embodiment the transmitter being capable of sending an output signal to actuate a plurality of motors for the purpose of lowering a plurality of windows in a motor vehicle.

The above description of the preferred embodiment of the present invention may be changed or modified by those skilled in the art, to which the invention pertains, without departing from the scope of the invention, which is intended to be limited only by the scope of the claims.

We claim:

1. An obstruction detecting system to detect an obstruction or a partial obstruction in or at the opening of a motor vehicle exhaust pipe comprising:
   a differential pressure sensor, a programmable logic device, a plastic tubing, a metal tube, a relay, and an alarm;
   said differential pressure sensor for detecting an obstruction or a partial obstruction in or at the opening of a motor vehicle exhaust pipe;
   said differential pressure sensor connected to said programmable logic device;
   said differential pressure sensor for sending an electrical signal to said programmable logic device in response to applied air pressure;
   said programmable logic device connected to said relay;
   said programmable logic device for sending an electrical signal to said relay if an obstruction or a partial obstruction is detected in or at the opening of a motor vehicle exhaust pipe;
   said plastic tubing connected to said differential pressure sensor;
   said plastic tubing for conveying air from a motor vehicle exhaust pipe to said differential pressure sensor;
   said metal tube connected to said plastic tubing;
   said metal tube for inserting through a hole drilled into a motor vehicle exhaust pipe;
   said metal tube for conveying air from a motor vehicle exhaust pipe to said plastic tubing;
   said relay connected to said alarm;
   said relay for sending an electrical signal to said alarm if an obstruction or a partial obstruction is detected in or at the opening of a motor vehicle exhaust pipe;
   said alarm for alerting occupants of a motor vehicle if an obstruction or a partial obstruction is detected in or at the opening of a motor vehicle exhaust pipe;
   said alarm being a visual alarm, an audible alarm, or both.

2. An obstruction detecting system to detect an obstruction or a partial obstruction in or at the opening of a motor vehicle exhaust pipe of claim 1,
   further comprising a housing;
   said housing being constructed from a cold resistant, slippery, non-stick plastic resin selected from the polytetrafluoroethylene group of materials.

3. An obstruction detecting system to detect an obstruction or a partial obstruction in or at the opening of a motor vehicle exhaust pipe of claim 1,
   said plastic tubing being constructed from a cold resistant, slippery, non-stick plastic resin selected from the polytetrafluoroethylene group of materials;
   said metal tube being constructed from brass, aluminum, chromium, or copper.

4. An obstruction detecting system to detect an obstruction or a partial obstruction in or at the opening of a motor vehicle exhaust pipe of claim 1,
   further comprising a latching relay, and a motor;
   said latching relay for actuating a motor;
   said motor for lowering a window in a motor vehicle.

* * * * *